United States Patent
Parsons

[15] 3,635,124
[45] Jan. 18, 1972

[54] USE OF TAPE-CONTROLLED MILLING MACHINES TO CARVE COMBUSTIBLE CASTING PATTERNS

[72] Inventor: John T. Parsons, 205 Wellington, Traverse City, Mich. 49684

[22] Filed: Oct. 20, 1969

[21] Appl. No.: 867,980

[52] U.S. Cl. ............................ 90/11 C, 90/13 R, 90/13 C
[51] Int. Cl. ........................................................ B23c 1/16
[58] Field of Search ........................ 90/13.99, 13, 11.3, 13.8

[56] References Cited

UNITED STATES PATENTS 3,002,115  9/1961  Johnson et al. ................... 90/13 C X
3,370,508  2/1968  Iaia ............................... 90/11 C Primary Examiner—Gil Weidenfeld
Attorney—Jerome A. Gross

[57] ABSTRACT

A tape-controlled milling machine, adjusted for material removal at a rate at least 100 times as great as for steel, is used to carve casting patterns from expanded polystyrene. Billets of the polystyrene material are carved without repetitive passes. Each rotatable cutter utilized is directed by the program of the tape to bring its edge through the excess material of the billet all the way to the final surface to be carved, and then to proceed along the final contour to be cut by it. Cost savings, material even where a single combustible pattern is to be produced, are multiplied when the tape is reused.

5 Claims, 2 Drawing Figures

PATENTED JAN 18 1972

3,635,124

Inventor
JOHN T. PARSONS
By Jerome A. Gross
Attorney

USE OF TAPE-CONTROLLED MILLING MACHINES TO CARVE COMBUSTIBLE CASTING PATTERNS

BACKGROUND OF THE INVENTION

The present invention relates both to material removal by tape-controlled milling machines, and to the formation of combustible casting patterns, as from expanded polystyrene.

Tape-controlled milling machines have heretofore been designed for milling steel and other metals according to taped programs which control the operations of the machine, determining the depth of cut and the direction and rate of movement of the cutter relative to the material. They are particularly valuable where a number of identical parts are to be milled; but even for making a single part, they are to be preferred when a skilled programmer is available. In machining ordinary steel, the rate of material removal is a function in part of the horsepower available at the spindle or spindles of the machine. When machining other materials, for example aluminum and other soft metals, the rate of material removal is not increased inversely according to the density of the material to be removed; although softer than steel, such other metals may have other qualities which interfere with their machineability. Likewise, in dealing with materials such as wood, one would not expect to remove material at a rate, compared with the removal rate of steel, inversely proportional to the comparative densities of wood to steel; because the aligned fibrous structure of the wood would not permit such a rapid removal without shattering.

In the art of making combustible patterns using expanded polystyrene, patternmakers have been employed; and they have followed conventional practices for making wood patterns. Thus, boards are cut from billets of the expanded polystyrene material and are glued together. When fillets are made, they are usually made as a wooden fillet would be made, that is, by cutting a strip of square cross section on the diagonal, and gluing it in place. The amount of work necessary to form an arcuate fillet is considered prohibitive. However, wax has been used, both as a fillet material and as a filler between imperfectly fitting polystyrene members glued together to form a pattern. Such construction of expanded polystyrene patterns is shown in U.S. Pat. No. 2,830,343. The amounts of glue and wax must be minimized, so that combustion of the pattern is not impaired; hence if patterns are of complex form, they are likely to be poorly assembled and badly aligned. Where a number of identical castings are to be produced, the cost of patternmaking is multiplied.

SUMMARY OF THE INVENTION

The purposes of the present invention include eliminating the laborious and expensive process by which combustible patterns, such as those formed of expanded polystyrene, are made painstakingly in the manner of wooden patterns; and to provide patterns of much greater accuracy, including integrally formed arcuate fillets made without patternmaking skills and at a high rate of speed, and in as large quantities as may be desired.

The present invention may be briefly summarized as a new use for tape-controlled milling machines, in which a method is provided of carving the type of low-density casting patterns which are combustible under a charge of molten cast metal. The preferred material is expanded polystyrene whose density is less than 3 pounds per cubic foot. In the present method, the machine is provided with a milling cutter, preferably of the type having the capacity to cut to a depth more than five times the feasible depth of cut when machining steel. The milling machine is adjusted, or rebuilt if necessary, to multiply depth of cut, linear feed, rate and speed of cutter rotation so as to achieve a rate of material removal at least 100 times as great as for steel. After a billet of the combustible pattern material is chucked in the machine, the tape directing the program of machine operations causes the desired pattern to be quickly carved. Regardless of the size of the billet, each cutter is directed through the excess billet material immediately to a position at which its cutting edge may carve a final surface portion of the pattern. Where the cutter edge to be utilized is a side edge, the cutter is so directed that this edge is brought into the billet to a position along the desired final contour of the pattern; thereafter the cutter edge follows a final contour portion, carving away all excess billet material. Where a depressed surface is to be carved transverse to the cutter spindles using a transverse edge as the cutter tip, the cutter is plunged axially into the billet until its tip reaches the depth at which such surface is to be carved, and its tip-cutting edge portion is then directed along a final contour portion of such surface. Meanwhile the tool portion thereabove removes the billet material thereabove over the full width of the cutter and the full depth to which it has been so plunged.

DESCRIPTION OF THE PREFERRED EMBODIMENT

Figure 2:
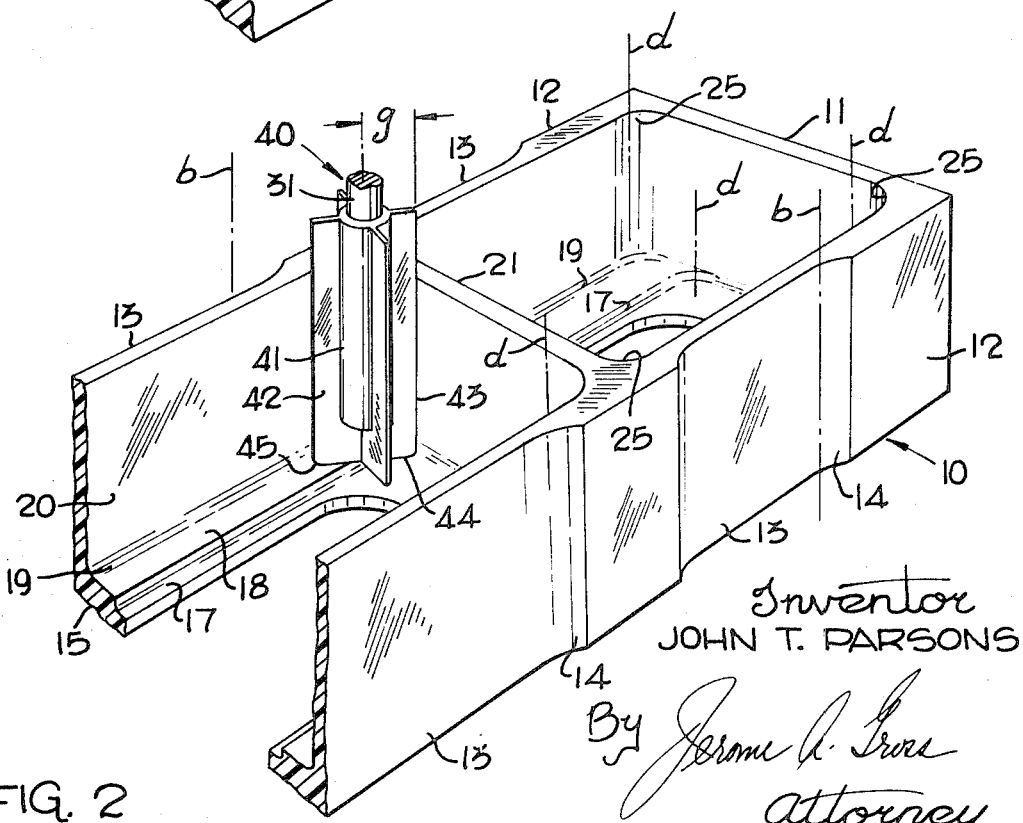
FIG. 2 is a view similar to FIG. 1 showing the subsequent carving, by a second milling cutter, of remaining surface portions to final contour.

The final product of the present invention is an integral casting pattern, generally designated 10, formed of low-density combustible pattern material to the relatively complex contours shown fragmentarily in FIG. 2. Expanded polystyrene of a density of between 1 and 3 pounds per cubic foot is preferred. The specific pattern illustrated is of hollow boxlike shape, having a square cut end wall 11 and parallel sidewalls 12 including thinned sections 13 joining the walls 12 at very large radius internal fillets 14 formed about axes $b$. The pattern 10 also has a bottom wall 15 including cutouts 16 flanked by small radius fillets 17 to be described, and leading upward in a step to a thickened bottom wall 18. A second small radius fillet 19 joins the bottom wall 18 to the inner vertical wall surfaces 20 of cavities cut within the pattern 10. In the embodiment shown, a plurality of such cavities is formed by crosswebs 21 whose thickness approximately equals that of the thinned wall sections 13. The walls, 11, 12 and webs 21 of the pattern 10 have a horizontal planar upper edge surface 21.

The vertical inner surfaces 20 of the several cavities of the pattern 10 flow smoothly into each other at internal arcuate fillets 25 of generous radius somewhat smaller than the external fillets 14 and formed about vertical axes $d$. The smaller radius fillets 17, 19 merge with the larger radius fillets 25 at the lower inside corners of such cavities.

In order to form the casting pattern 10 according to the method of the present invention, I commence with a rectangular billet of the expanded polystyrene material, cut to the length, width and depth shown. I first form the roughly carved article generally designated 30 shown in FIG. 1. To do so I chuck the billet in a tape-controlled milling machine, whose vertical driving spindle 31 is shown fragmentarily in the drawings. The milling machine utilized is of a conventional-type designed to machine steel, and the horsepower delivered to the driving spindle 31 is such as will remove steel alloys, for example, those conventionally used in casting, at a known or determinable rate of material removal.

In carrying out the present invention, I so adjust or modify the speed of the milling machine, changing in its controls and lead screws if necessary, to effect a rate of material removal of a much greater order of magnitude. To machine a billet of combustible pattern material of expanded polystyrene whose density is between 1 and 3 pounds per cubic foot, I adjust the speed, feed and depth of cut of the machine so that the rate of material removal for polystyrene will bear substantially the same ratio to the rate of material removed for steel as the density of steel bears to the density of the polystyrene pattern material. This rate of material removal may be 400 or 500 times as great as that for steel, so that a tape-controlled milling machine may cut a pattern in a very short time period. If so rapid rate of material removal should not be necessary, material may be removed, in any event, at a rate at least substantially 100 times as great as that rate for which the milling machine is designed to remove steel.

A large diameter cutter, generally designated 32, is used having a central shaft 33 and plurality of radially projecting bladelike cutting elements 34 whose vertical cutting edges 35 project from the axis of the spindle 31 a radius $f$ which equals the radius of the large radius fillets. The program of the machine carves the external vertical surfaces of the roughly carved article 30 by passing the cutter 32 into the billet and around the outer sides of the pattern to be formed, with the cutter axis 31 at a spacing from final contour portions equal to the radius $f$. In a single pass, it forms all of the vertical outer walls to final contour, including the square cut end wall 11 and the sidewalls 12. When forming the sidewalls 12, the tape program directs the driving spindle 31 immediately inward to the axes $b$ at the intersections of the sidewalls 12 and the thin wall sections 13; from such axes $b$ the driving spindle 31 changes its angular movement direction abruptly, to continue parallel to the thinned wall section 13 to be formed. At each such abrupt angular change of movement, an internal fillet 14 is formed whose radius equals that of the milling cutter 32.

Roughly cut hollows 37 within the article 30 are then formed with the same milling cutter 32, to extend through its entire depth. Machining the hollows 37 is commencing in a most unusual manner: the tape program causes the rotating spindle 31 merely to plunge the cutter 32 axially downward to the bottom of the billet, at a suitable distance from inner walls 38 of the hollows 37. The taped program then directs the spindle 31 to carve such walls 38, proceeding to the vertical corner axes where corner fillets 39 are to be formed and then abruptly changing its direction of angular movement. At the axes where direction of movement is so changed, fillets 39 are formed, with radii equal to the radius $f$ of the cutter 32. Where, as shown, the hollows 37 are rectangular, the program should change the angle of spindle movement by 90°. The tape program causes the spindle 31 to traverse back and forth until each of the hollows 38 is preliminarily carved to the contours shown in FIG. 1.

The physical nature of expanded polystyrene bead material permits a depth of machining cut much greater than has been heretofore considered possible. I have found it feasible to use a depth of cut substantially as large as the entire diameter of the cutter 32, which may be 5 inches or more. To do this and form a horizontal lower surface, as might be used in some patterns, the bottom edges 36 of the cutter 32 are formed perpendicular to the spindle 31. Where such great depth of cut is not necessary, it may in nearly all cases be substantially equal to or greater than the cutter radius $f$; and in every case more than 5 times the depth of cut feasible for cutting a similar wall from a steel blank.

The final pattern shown in FIG. 2 is characterized by the thinner outside walls there illustrated, the relatively thin vertical webs 21, and by the stepped thickness leading to the thickened bottom wall 18, with small radius fillets 17, 19 above and below the stop.

Figure 1:
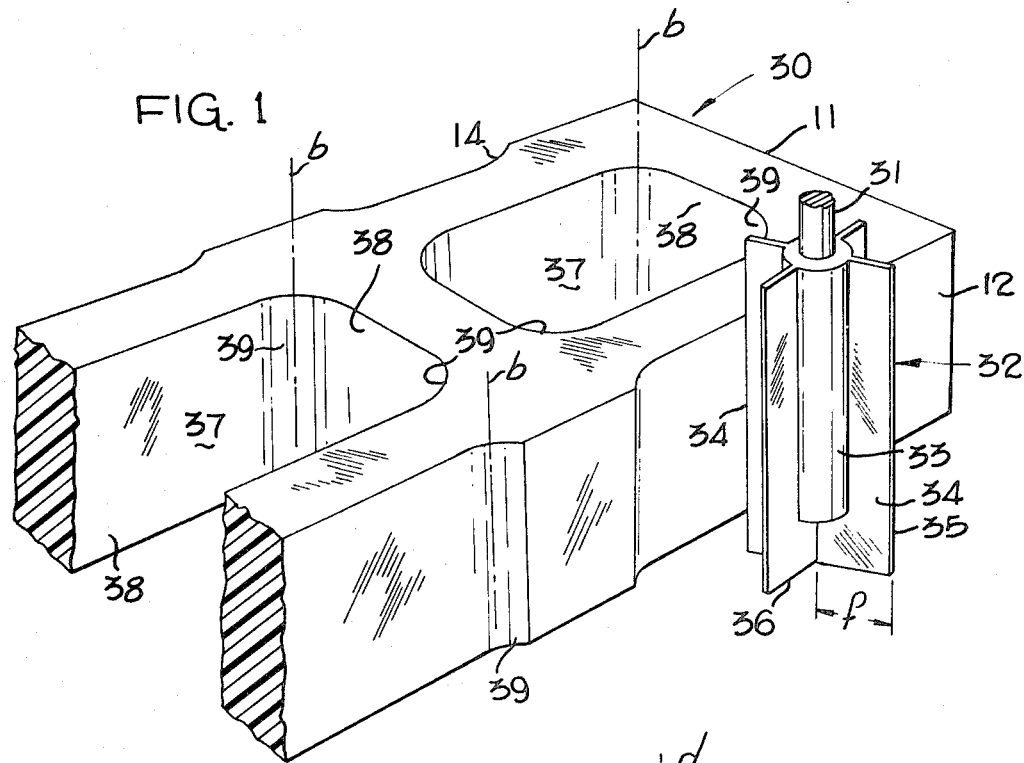
FIG. 1 is a fragmentary view of a billet of expanded polystyrene material, illustrated in the course of being cut partly to final contour by a first cutter of a tape-controlled milling machine (not shown).

To machine the roughly carved billet shown in FIG. 1 into the final casting pattern shown in FIG. 2, a second milling cutter generally designated 40 is utilized. It includes a central shaft portion 41 with radially extending bladelike cutting elements 42 having vertical cutting edges 43 whose radial extent $g$ equals the radius of the internal fillets 25. In order to form the small radius fillets 17, 19 the lower tip ends of the bladelike cutting elements 42 are arcuately rounded. They provide a flat central tip portion 44, which is perpendicular to the shaft portion 41, and arcuately curved outer tip portions 45, whose arcuate radius equals the radii of the smaller radius fillets 17, 19. The smaller radius fillets 19 are cut by the outer tip portions 45 while the central tip portion 44 cuts the upper surface of the bottom wall 18.

In enlarging the hollows 37 to form the final inner surfaces 20 of the walls 12 and the vertical web surfaces 21, the procedure used is much the same as has heretofore been described for carving the hollows 37. The milling cutter 40 is programmed to plunge its transverse cutter tip portion 44 to the depth at which the bottom wall 18 is to be formed, either directly through previously uncut material of the billet or by descending first through the hollows 37 to such depth, and then moving sideward therefrom, immediately to a position at which its tip edge 44 is at a part of the final contour of the bottom wall 18 so to be carved. The program then directs the cutter 40 to proceed to an axis $d$ of a vertical internal fillet 25 and then change its direction of movement abruptly by 90°. However, as the cutter 40 moves inward from the vertical walls 20, 21 the program of the machine moves the spindle 31 axially downward, to cut the step in the bottom wall 18 and the small fillets 17, also creating large radius corner fillets as seen near the right side of FIG. 2.

When a flat bottom surface is to be formed inwardly of such small radius fillets, by successive parallel traverses of the spindle 31, the maximum depth of cut will be the diameter of the cutter 40 less the radius of the outer tip portion 45. Using the expanded polystyrene material described, bottom surfaces perpendicular to the spindle axis will be cleanly cut at this maximum rate of material removal, assuming adequate horsepower is supplied to the spindle 31.

The present method of machining, at speeds heretofore considered impossible, is successful in part because of the unique structure of the self-adhered expanded plastic beads which make up the low-density polystyrene material. Only the beads at the final pattern surfaces need be truly cut; the larger mass of material is removed in effect by gouging.

Thus, the present invention provides for a greatly multiplied rate of material removal. By removing polystyrene material at a rate whose order of magnitude bears substantially the same ratio to the rate of material removed for steel as the density of steel bears to the density of the pattern material, polystyrene patterns are quickly produced in quantity. If such quantity production does not require the maximum rate of material removal, it will in any event be at least 100 times as great as that for steel. The patterns produced by the present invention are precisely carved, integral, and without objectionable inclusions of wax or glue; in these respects, as well as in lower cost, they are much preferable to patterns produced laboriously by pattern makers.

Various modifications, desired for particular uses, will be obvious. For example, if instead of the smaller radius fillets 17, 19 a straight bevel fillet is desired, the cutter 40 might have beveled tip portions instead of the arcuate portions 45. The maximum depth of cut would then be the diameter of the cutter less the width of the bevel fillet.

In this application, the term "milling machines" includes those machine tools in which cutters are mounted on powered rotating spindles, and which provide for relative movement, perpendicular to the spindle axis, between the spindle and the material to be cut. In this category are so-called "machining centers" having automatic tool changes controlling their tape programs.

The term "depth of cut" means the spacing between successive traverses of the spindle, measured perpendicular to the spindle axis. Thus where the spindle axis is vertical, as illustrated, the depth of cut is a distance measured in a horizontal plane. In referring to milling cutters, the expression "radially projecting bladelike cutting elements" is used in the sense that the radial projection of the cutting elements is substantial, and hence capable of making a relatively deep cut. As so used, this term includes cutter elements of convoluted or spiral shape, as well as the relatively flat-bladed cutter elements illustrated. For greatest depth of cut, that is, where the cutter radial projection must be greatest, I prefer to use such convoluted cutters, so that the pattern material, being carved at a high rate of material removal, will be lifted away from the region of carving.

I claim:

1. As a new use for a preprogrammed milling machine which follows out automatically a previously devised program of instructions, the method of carving casting patterns from pattern material comprised of self-adhered beads of expanded polystyrene and whose density is less than 3 pounds per cubic foot, and which is combustible under a charge of molten metal, comprising the steps of providing the machine with a rotatable cutter having a cutting edge spaced radially from its axis and having the capacity to cut such material at more than five times the feasible depth of cut when machining steel, chucking in the machine a billet of such material whose size exceeds that of the casting pattern to be carved therefrom, feeding to the machine a previously devised program of instructions which provides such a linear feed rate and speed of cutter rotation as to achieve a rate of material removal at least 100 times as great as that for steel, and which directs movement of the cutting edge into the billet immediately to a position along a portion of the desired final contour, and thence directly along said final contour portion, and operating the machine to carve the billet at such rate of material removal according to the program, whereby to cut to contour those self-adhered beads along the desired final contour and simultaneously to remove the beads making up the material outwardly thereof.

2. As a new use for a preprogrammed milling machine, the method of carving a casting pattern from a pattern material which is combustible under a charge of molten metal and whose density is less than 3 pounds per cubic foot, comprising the steps of providing the machine with a rotatable cutter having a spindle axis of rotation and a cutting edge spaced radially outward therefrom, and having the capacity to cut such material at more than five times the feasible depth of cut when machining steel, chucking in the machine a billet of such combustible pattern material whose size exceeds that of the casting pattern to be carved therefrom, providing the machine with a carving program which provides such a linear feed rate and speed of cutter rotation as to achieve a rate of material removal at least 100 times as great as that for steel, and under which such cutter is directed immediately into the billet, through such excess size, to a point at which its said cutting edge reaches a final surface portion of the pattern to be carved, and under which program the cutter is then directed along such path that its cutting edge follows a portion of the final contour of the pattern, and then operating the machine to move said cutter according to said program, whereby the final surface portion of such pattern is provided without repetitive cuts regardless of the amount of excess billet material.

3. The method of carving casting patterns as defined in claim 2, comprising the further steps of providing a machine with a second rotatable cutter having a cutting edge extending radially outward from its axis of rotation and following a conformation relative thereto which differs from such first cutter, and supplementing the carving program so provided for such first cutter with a program for such second cutter, under which it is directed immediately through any excess of billet remaining until its cutting edge reaches a final surface portion to be carved by said second cutter, and under which supplementary program said second cutter is then directed along such path that its cutting edge follows a portion of the final contour of the pattern to be carved by said second cutter, together with the step of operating the machine to direct said second cutter according to said supplementary program, whereby said second cutter carves final surface portions according to its conformation directly and without repetitive cuts.

4. As a new use for a tape-controlled milling machine, the method of carving a casting pattern as described in claim 2, which has, as part of its final contour, two surface portions joined by a radially curved internal fillet, comprising the steps defined in claim 2, in which the radius of the rotatable cutter so provided equals that of the fillet, and in which the carving program so provided directs the cutter edge along the final contour of the first of said two surface portions to a point at which the cutter axis coincides with the axis of said radially curved internal fillet, and there, directs the cutter edge, with an abrupt change of direction, to follow the contour of said second surface portion.

5. As a new use for a preprogrammed milling machine, the method of carving a casting pattern from a pattern material which is combustible under a charge of molten metal and whose density is less than 3 pounds per cubic foot, which pattern to be carved includes a surface portion depressed from other portions and extending transverse to the direction at which the axis of a rotatable cutter may conveniently be applied, comprising the steps of providing the machine with a rotatable cutter having a spindle axis of rotation, a cutting edge extending axially and spaced radially outward therefrom, and a tip-cutting edge portion extending transverse to its axis of rotation, and having the capacity to cut such material at more than five times the feasible depth of cut when machining steel, then chucking in the machine a billet of such combustible pattern material whose size exceeds that of the casting pattern to be carved therefrom, providing the machine with a carving program which provides such a linear feed rate and speed of cutter rotation as to achieve a rate of material removal at least 100 times as great as that for steel, and under which such cutter is plunged axially into the billet to such depth that its tip-cutting edge portion reaches the depth of final contour at which such depressed surface portion is to be carved, and under which program the cutter is then directed through the billet along such path that its cutting edge follows at least part of the final contour of such transverse surface portion, and then operating the machine to move said cutter according to said program, whereby the tip cutting edge carves such final surface portion at its depth so depressed from such other pattern portions, while the tool portion thereabove removes the billet material thereabove.

* * * * *